US010296564B2

(12) United States Patent
Hsu et al.

(10) Patent No.: US 10,296,564 B2
(45) Date of Patent: May 21, 2019

(54) HYBRID WEB PUBLISHING SYSTEM

(71) Applicant: Axure Software Solutions, Inc., San Diego, CA (US)

(72) Inventors: Victor Hsu, San Diego, CA (US); Martin Smith, San Diego, CA (US); Samir Hashem, San Diego, CA (US)

(73) Assignee: Axure Software Solutions, Inc., San Diego, CA (US)

( * ) Notice: Subject to any disclaimer, the term of this patent is extended or adjusted under 35 U.S.C. 154(b) by 129 days.

(21) Appl. No.: 15/250,472

(22) Filed: Aug. 29, 2016

(65) Prior Publication Data

US 2016/0364372 A1   Dec. 15, 2016

Related U.S. Application Data

(63) Continuation of application No. 14/105,032, filed on Dec. 12, 2013, now Pat. No. 9,430,579.

(51) Int. Cl.
*G06F 17/22* (2006.01)
*G06F 17/24* (2006.01)
(Continued)

(52) U.S. Cl.
CPC ........ *G06F 17/2247* (2013.01); *G06F 3/0486* (2013.01); *G06F 16/958* (2019.01);
(Continued)

(58) Field of Classification Search
CPC .................................................. G06F 17/2247
See application file for complete search history.

(56) References Cited

U.S. PATENT DOCUMENTS 6,038,567 A   3/2000 Young
6,560,639 B1  5/2003 Dan et al.
(Continued)

FOREIGN PATENT DOCUMENTS

KR    1020070092360    9/2007
WO       0125986 A    4/2001
(Continued)

OTHER PUBLICATIONS

John Ulliman et al., Adobe® Business Catalyst®_ Design full-featured websites without the hassles of development, Sep. 29, 2011, Adobe Press.*
(Continued)

*Primary Examiner* — Scott T Baderman
*Assistant Examiner* — Seung Woon Jung

(57) ABSTRACT

A system comprises a first workstation that locally instantiates a design tool configured to allow a designer to specify a design for a web page. A data store is locally available to the first workstation, and receives and stores the design as a saved design. A second workstation provides access to a code editor to allow a programmer to specify a modification to an encoding of the design. A server means instantiates the code editor for the second workstation, saves the modification as a saved modification, and serves the encoding of the design in accordance with the modification by combining the saved modification with the saved design. The server means seamlessly combines the saved design and the saved modification such that the saved modification and the saved design can each be independently altered and recombined to produce a modified encoding of the design.

21 Claims, 3 Drawing Sheets

(51) Int. Cl.
*G06F 16/958* (2019.01)
*G06F 3/0486* (2013.01)
*H04L 29/08* (2006.01)
*H04L 29/06* (2006.01)

(52) U.S. Cl.
CPC ...... *G06F 17/2205* (2013.01); *G06F 17/2252* (2013.01); *G06F 17/24* (2013.01); *H04L 67/02* (2013.01); *H04L 67/34* (2013.01); *H04L 67/42* (2013.01)

(56) References Cited

U.S. PATENT DOCUMENTS

| | | | |
|---|---|---|---|
| 6,601,057 | B1 | 7/2003 | Underwood et al. |
| 7,668,913 | B1 | 2/2010 | Underwood et al. |
| 7,716,634 | B2 | 5/2010 | Ross et al. |
| 8,046,736 | B1 | 10/2011 | Freeman et al. |
| 8,136,027 | B2 | 3/2012 | Underwood et al. |
| 8,180,829 | B2 | 5/2012 | Arav |
| 8,402,060 | B2 | 3/2013 | Elad et al. |
| 8,595,691 | B2 | 11/2013 | Ellen et al. |
| 9,430,579 | B2 | 8/2016 | Hsu et al. |
| 2004/0049598 | A1 | 3/2004 | Tucker et al. |
| 2004/0167989 | A1 | 8/2004 | Kline et al. |
| 2004/0215719 | A1 | 10/2004 | Altshuler |
| 2006/0294199 | A1 | 12/2006 | Bertholf |
| 2007/0204013 | A1 | 8/2007 | Castrucci |
| 2008/0244740 | A1 | 10/2008 | Hicks et al. |
| 2010/0095197 | A1* | 4/2010 | Klevenz ............ G06F 17/2247 715/234 |
| 2010/0235806 | A1 | 9/2010 | Mohan |
| 2010/0251143 | A1* | 9/2010 | Thomas ............ G06F 17/3089 715/760 |
| 2010/0313183 | A1 | 12/2010 | Ellen et al. |
| 2012/0291005 | A1 | 11/2012 | Quine |
| 2013/0298061 | A1 | 11/2013 | Bimson et al. |
| 2013/0312044 | A1 | 11/2013 | Itagaki |
| 2013/0326333 | A1 | 12/2013 | Hashmi |

FOREIGN PATENT DOCUMENTS

| | | |
|---|---|---|
| WO | 0171551 A | 9/2001 |
| WO | 2010097688 A | 9/2010 |
| WO | 2013124858 A | 8/2013 |

OTHER PUBLICATIONS

Business Catalyst Features Video, Adobe, Accessed on Nov. 25, 2013, http://tv.adobe.com/watch/leam-business-catalystJadding-business-catalyst-features-to-your-muse-sites/.
Homepage, Drupal, Accessed on Dec. 11, 2013, https://drupal.org/home.
Homepage, Joomla, Accessed on Dec. 1, 2013, http://www.joomla.org/.
Homepage, Wordpress.org, Accessed on Dec. 11, 2013, http://wordpress.org.
International Search Report and Writen Opinion dated Mar. 18, 2015 for PCT Application No. PCT/US2014/068797.
Notice of Allowance dated Apr. 29, 2016 for U.S. Appl. No. 14/105,032.
Office Action dated Dec. 3, 2015 for U.S. Appl. No. 14/105,032.
Office Action dated Feb. 13, 2014 for U.S. Appl. No. 14/105,032.
Office Action dated Jul. 29, 2014 for U.S. Appl. No. 14/105,032.
Office Action dated Jul. 7, 2015 for U.S. Appl. No. 14/105,032.
Typography in Muse, Part 1, Adobe.com, Accessed on Dec. 11, 2013, Available at http://helpx.adobe.com/muse/tutorials/typography-muse-part-1.html.

* cited by examiner

HYBRID WEB PUBLISHING SYSTEM

CROSS REFERENCE TO RELATED APPLICATIONS

This application is a continuation of U.S. application Ser. No. 14/105,032, filed Dec. 12, 2013 which is incorporated by reference herein in its entirety for all purposes.

BACKGROUND OF THE INVENTION

Traditional web publishing involved the collaboration of programmers and webmasters working together to create and maintain a website. Programmers would hand code an encoding of the website using a computer language such as HTML. After the website was put into operation, specialized stakeholders called webmasters would be responsible for updating and maintaining the website throughout the course of the website's life. In the situation of a website with continually modified content such as an ecommerce site, blog posting site, or news site, the webmasters would need to modify the website on a daily basis. Modifying the encoding of the website by hand was a time consuming approach that was obsoleted for its inefficiency in the early days of the Internet.

Content Management Systems (CMS) are tools that facilitate the work of a webmaster in updating the content of a website. The CMS can be as simple as a tool that allows a blogger to easily post new updates to their website, or more complex tools that allow webmasters working on ecommerce sites to continually update the product offerings of a large enterprise. Many of these tools also allow a user to customize the look and feel of their website when it is first created, and may also allow the user to change the appearance of their website at a later date. The complexity of a CMS tends to vary inversely with the sophistication of the target user. For example, a CMS tool targeting bloggers with no programming skill whatsoever will provide a very simple interface and a shallow feature set; whereas a CMS tool targeting sophisticated webmasters, that are essentially programmers themselves, will provide a deep feature set with less hand-holding and more exposure to raw computer code.

In addition to CMS, other tools have recently grown in prominence that allow users to more fully customize a website. These tools allow a nonprogrammer stakeholder to specify not just the content of the website, or the look and feel of a pre-baked web template, but to specify the interactivity and substance of the entire website. At a certain point, these tools are no longer considered CMS tools and instead fall into the category of web design tools. Stakeholders that utilize these tools can be referred to as designers. Many of these web design tools provide a graphical interface to the designer such that the designer does not need to have any programming experience whatsoever to design the website. Once the design has been specified in the design tool, it can be exported from the tool in the form of an encoding of the design. For example, the encoding could be a combination of files in the form of HTML, JavaScript, and CSS along with any other programming languages that can be used to encode a website design. The encoding can then be used to render the website in a player such as a web browser.

SUMMARY OF INVENTION

In one embodiment of the invention, a system is provided. The system includes a first workstation that locally instantiates a graphical design tool configured to allow a designer to specify a design for a web page. The system also includes a data store that is: (i) locally available to the first workstation, and (ii) receives and stores the design as a saved design. The system also includes a second workstation that provides access to a code editor to allow a programmer to specify a modification to an encoding of the design. The system also includes a server means that: (i) instantiates the code editor for the second workstation; (ii) saves the modification as a saved modification; and (iii) serves the encoding of the design in accordance with the modification by combining the saved modification with the saved design. The server means seamlessly combines the saved design and the saved modification such that the saved modification and the saved design can each be independently altered and recombined to produce a modified encoding of the design.

In another embodiment of the invention, a method is provided. The method includes, instantiating a code editor for a programmer from a server means. The method also includes receiving a design from a computer via a network. The design is a web page design and is specified using a graphical design tool. The method also includes providing the code editor to the programmer via the network. The code editor allows the programmer to specify a modification to the design. The method also includes receiving the modification to the design via the network. The method also includes exporting the design to create an encoding of the design. The encoding of the design is capable of being rendered in a web browser. The method also includes combining the modification and the encoding of the design to create a modified encoding of the design. The method also includes rendering the modified encoding of the design in the web browser as a modified web page. The method also includes receiving a second modification to the design via the network after rendering the modified encoding of the design. The method also includes combining the second modification and the encoding of the design to create a second modified encoding of the design. The method also includes rendering the second modified encoding of the design in a web browser as a second modified web page.

In another embodiment of the invention, a method is provided. The method includes, instantiating a code editor for a programmer from a server means. The method also includes receiving a design from a computer via a network. The design is a web page design and is specified using a graphical design tool. The method also includes providing the code editor to the programmer via the network. The code editor allows the programmer to specify a modification to the design. The method also includes receiving the modification to the design via the network. The method also includes exporting the design to create an encoding of the design. The encoding of the design is capable of being rendered in a web browser. The method also includes combining the modification and the encoding of the design to create a modified encoding of the design. The method also includes rendering the modified encoding of the design in the web browser as a modified web page. The method also includes receiving a second design from the computer via the network after rendering the modified encoding of the design. The second design is a modified version of the web page design and is specified using the graphical design tool. The method also includes exporting the second design to create an encoding of the second design. The encoding of the second design is capable of being rendered in the web browser. The method also includes combining the modification and the encoding of the second design to create a modified encoding of the second design. The method also includes rendering the modified encoding of the second design in the web browser as a second modified web page.

DETAILED DESCRIPTION OF THE EMBODIMENTS

Figure 1:
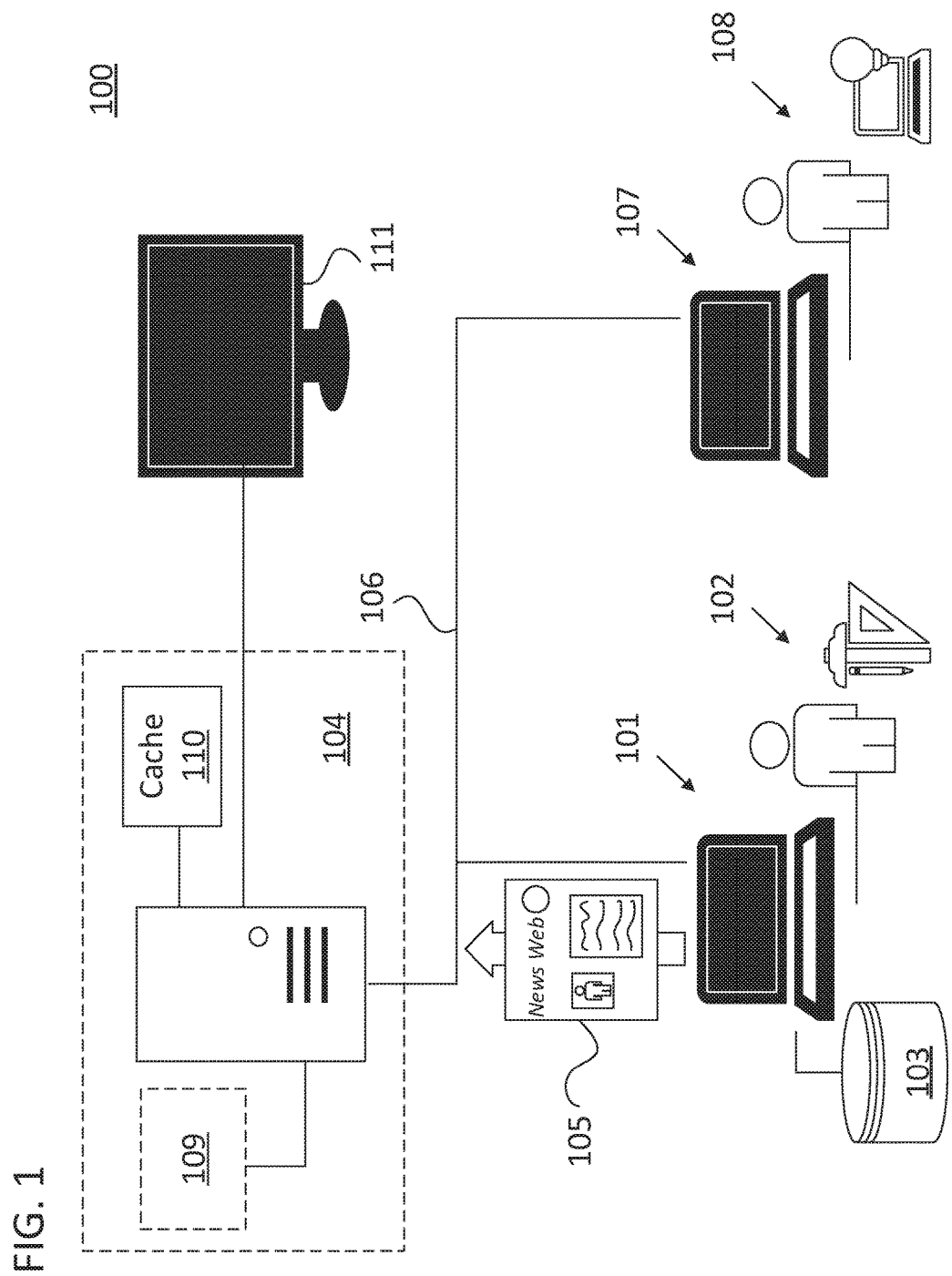
FIG. 1 illustrates a block diagram of a website design and modification system.

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers all such modifications and variations within the scope of the appended claims and their equivalents.

Related approaches to website publishing and management described previously exhibit certain drawbacks. Design tools such as drag and drop graphical design tools and wizard-based systems are generally limited in terms of the content they allow a designer to incorporate into a design because the creator of the design tool has to facilitate the specification of that content. Although a design tool that allowed a designer to specify any web page that was capable of being rendered in a web browser would be desirable, most design tools do not. Therefore, different design stakeholders, such as programmers or software developers, are often needed to modify a design from a design tool so that the modified design exhibits certain functionality or includes certain content that was not available in the design tool. Related approaches that address this situation do not do so in a way that provides a liquid design flow in that programmers and designers generally take turns blocking the design flow and slowing down other stakeholders.

Related approaches that provide both programmers and designers access to an integrated tool, or set of tools, can alleviate some of the problems mentioned in the previous paragraph, but they tend to replace those problems with a different set of drawbacks. An integrated design tool that allowed any external code to be entered in the design environment would obviously be less limited in terms of the potential design content and functionality available to the designer while specifying the design. Also, integrated approaches can lead to a liquid design flow because the input of programmers and designers can be managed by the integrated tool. However, allowing external code to be entered into a design environment can lead to problematic security concerns. Most design environments are run locally on an individual's computer as opposed to being served from a server. As a result, malicious code can do more harm if run in a standard design environment as opposed to being executed in a web browser. For example, a designer without programming experience might pull in a harmful code snippet externally which could harm the design environment and could temporarily shut down the design flow of an entire company. Furthermore, integrated tools are also suboptimal because stakeholders with different specialties might not be provided with a tool or environment that is most conducive to their strengths. For example, a programmer may have to learn how to operate a graphical design tool, while a designer without programming experience may be exposed to an overwhelming degree of interaction with raw code.

Embodiments of the present invention alleviate the problems described above by providing a hybrid web publishing system that includes a code editor and a design environment that are operated in tandem to allow a seamless server-orchestrated combination of modifications to the design using a code editor and alterations to the design using the design environment. In some of these embodiments, different stakeholders in the design process are provided with user interfaces and design tools that are specifically targeted to stakeholders with their particular skill set, while the different stakeholders are still able to seamlessly collaborate on the specification of the overall design. In specific embodiments of the invention, the design environment is locally instantiated on a workstation and designs are saved and uploaded to the server or exported and uploaded to the server. In some of these embodiments, the design environment is isolated from modifications made using the code editor. In some of these embodiments the design environment can be kept safe from malicious or other harmful code that could damage the design environment if it had been added to a design within the design environment. In other specific embodiments of the invention, the combination occurs after the design is exported or uploaded. In some of these embodiments, the modification process is facilitated because the time consuming step of exporting the design or uploading the design to the server does not need to be repeated every time the design is modified.

The benefits described in the preceding paragraph are provided, at least in part, by system 100 in FIG. 1. System 100 includes workstation 101 that enables a designer such as designer 102 to specify a design for a web page. The workstation can enable designer 102 to specify a web page by locally instantiating a graphical design tool. The graphical design tool can be intended for use by stakeholders that have no programming experience. For example, the graphical design tool could provide a user with a drag and drop interface for specifying website elements for the design, and for specifying how those elements interact. As another example, the graphical design tool could provide a user with a series of wizard interfaces for specifying customizations to predefined website templates. The graphical design tool is instantiated locally at the workstation such that there is no need to access an external network while the design is being specified by the designer. Furthermore, the graphical design tool and the workstation itself can be isolated from any incoming traffic from an external network. The first workstation has access to a locally accessible data store 103 that receives and stores the design as a saved design. The designer can choose when the design is saved in preparation for uploading or exporting the design. The design can be uploaded from workstation 101 to a server means such as server means 104. Uploading the design could involve sending the design as a saved design from workstation 101 to server means 104. For example, design 105 is shown symbolically in FIG. 1 being transmitted over network 106 to server means 104.

Server means 104 can be any system of software and suitable computer hardware that is capable of responding to requests across a network to provide a network service.

Although, server means 104 is illustrated as a single unit of physical hardware, server means 104 may comprise multiple physical hardware units. The physical hardware units can include personal computers, workstation, and dedicated enterprise server blades. The physical hardware units can be in a single physical location such as an office or data center, but they may also be located at separate data centers or offices. The server means can be a virtualized server. Individual network service can be provided by individual servers or multiple servers, as well as individual units of physical hardware or multiple units of physical hardware. As the term "server means" is used to describe a system that provides multiple network services in certain portions of this disclosure, it is implied that the multiple network services are not necessarily being supplied by a single unit of physical hardware.

System 100 also includes second workstation 107 that provides a programmer 108 with access to a code editor to allow the programmer to specify a modification to an encoding of a design. The encoding of the design can be an exported version of design 105. For example, the design can be exported from the format of the graphical design tool instantiated on workstation 101 to produce an encoding of the design in the form of one or more files containing JavaScript, HTML, and/or CSS code that can be used to render a website. The code editor can be instantiated by server means 104. Server means 104 can include a software-as-service server for this purpose. For example, the code editor could be a web application served by server means 104 to workstation 107. After specifying the modification in the code editor, programmer 108 could choose to save the modification of the design to server means 104. However, server means 104 could also continuously maintain a saved version of the modification in real time as the modification was specified on workstation 107. Server means 104 can comprise a database server for this purpose. After the modification is saved, server means 104 could be able to apply that modification to an encoding of the design to thereby create a modified encoding of the design. In this manner, programmer 108 is able to use the code editor to modify the design separately from the specification of the design by designer 102.

Server means 104 seamlessly combines the saved design and the saved modification such that the saved modification and said saved design can each be independently altered and recombined to produce a modified encoding of the design. Particular methods by which this seamless combination can take place are described in more detail below. Among other benefit of this approach is the fact that programmer 108 and designer 102 can independently alter their portions of the overall design. This facilitates collaboration because two parts of the design process are decoupled. Also, in some situations, this approach allows the individual stakeholders to operate tools that are directly targeted to their needs and skill set.

As mentioned previously, the design environment provided by workstation 101 might not be able to provide certain design content and functionality that can later be added by programmer 108. For example, a modification specified by programmer 108 could be a code snippet for a plugin feature that cannot be defined in the design environment. The plugin could provide a complex function such as sending data from the website to a remote data storage site every time a button is pushed. Since some design tools might not allow designers to build that kind of advanced functionality, the functionality would need to be added to the design via a modification specified on workstation 107. As such, the system allows designs specified in the design to exhibiting rich feature and content sets while keeping the design environment on workstation simple and manageable for designers such as designer 102. At the same time, such a system would shield the design environment from having to run potentially harmful code locally on workstation 101.

A set of computer-implemented methods 200 that can be executed by a server means, such as server means 104, can be described with reference to FIG. 2. In step 201, a code editor is instantiated for a programmer from a server means. The server means could be server means 104. In step 202, the code editor is provided to the programmer via a network such as network 106. The code editor allows the programmer to specify a modification to a design. The code editor could be provided to the programmer via a workstation such as workstation 107.

In step 203, a design is received from a computer via the network. The computer could be a workstation such as workstation 101. The design can be a web page design that was specified using a graphical design tool. The design could be specified by a designer such as designer 102 using workstation 101. The design can be exported to create an encoding of the design. The encoding can be multiple files and can comprise HTML, CSS, and JavaScript. The encoding can also be capable of being rendered in a browser. The encoding can contain all of the code and content needed to render a complete website or may be a portion of the code and content. For example, the encoding may need access to additional files such as image or video files to render a complete website.

In step 204, a modification to the design is received via the network. The modification could be a code snippet entered by a programmer. Alternatively, the modification could be a machine generated script capable of modifying a block of code upon execution. The modification could be code snippet to enable the design to provide the functionality of a desired website plugin. The modification could also include instructions for where the modification should be entered into an encoding. The instructions could take the form of a script that can be used to insert the modification at a specific point or set of points in the encoding.

In step 205, the modification and the encoding of the design are combined by the server means to create a modified encoding of the design. For example, a code snippet could be inserted into the encoding of the design to add the functionality provided by that code snippet to the design even if that functionality could not be defined in the design environment. As another example, the links for a web page in the design could be modified to reflect a different uniform resource locator. This type of modification would be useful in situations where the graphical design environment assigned URLs to pages that did not match the URL that a designer wanted to have appear in the final design when it was rendered in a browser. As mentioned previously, combining the modifications with the design on a server allows for an additional step of isolating the modifications from the computer that is used to specify the design. As a result, malicious or harmful code in a modification is not run on a local machine and is instead kept isolated on a server.

The resulting modified encoding could be rendered in a web browser in step 206, and could then be independently modified by either the design environment or the code editor to further modify the encoding and produce alternative designs. For example, in step 207 a second modification to the design could be received. Then, the second modification and the original design could be combined in a second iteration of step 205 in which a second modified encoding of the design was created. In this example, the modification was independently re-specified and recombined with the original design such that the design did not need to be re-exported or re-uploaded. In a second iteration of step 206, the second modified encoding of the design could be rendered in a web browser. As another example, in step 208, a second design can be received. The second design could be a modified version of the original web page design and have been specified using the graphical design tool. For example, a designer may have decided to change the appearance of a title font in a web page, and proceeded to create a second design in which that change was implemented. Instead of having the programmer re-modify the second design in the same way the first design was modified, the second design could instead be exported from the design program and combined with the modification in an alternative second iteration of step 205. As a result, the programmer will not need to duplicate work because the designer decided to make a minor modification to the design, but the second modified design can still be rendered as a finalized design in step 206 in accordance with the original modification. Any number of iterations through either loop that includes render step 206 and combine step 205 could be conducted to facilitate a liquid and open-ended design and modification process.

All of the steps in the set of computer-implemented methods 200 can be executed by a server means. For example, the steps could be executed by server means 104. However, the exporting of the design to create an encoding of the design could alternatively be conducted by a computer in which the design was specified. For example, workstation 101 could export the design from the design environment and upload design 105 as an encoding to server means 104. The encoding could be uploaded as a single file or as multiple separate files. The files could be uploaded in batch, in multiple batches, or in real time as they are produced by the export process. The precise method for the upload could also be transparent to the user. The alternative, in which the design is exported on the server means 104, involves workstation 101 uploading the design in the native format of the design program to server means 104, and conducting the export of the design on the server means at a later time. Another alternative is to create an intermediate export for the design on workstation 101 via an intermediate export process, upload the intermediate export to server means 104, and complete the export process on server means 104. The intermediate export could be uploaded using similar approaches to those describe above with reference to uploading the fully exported encoding.

Figure 2:
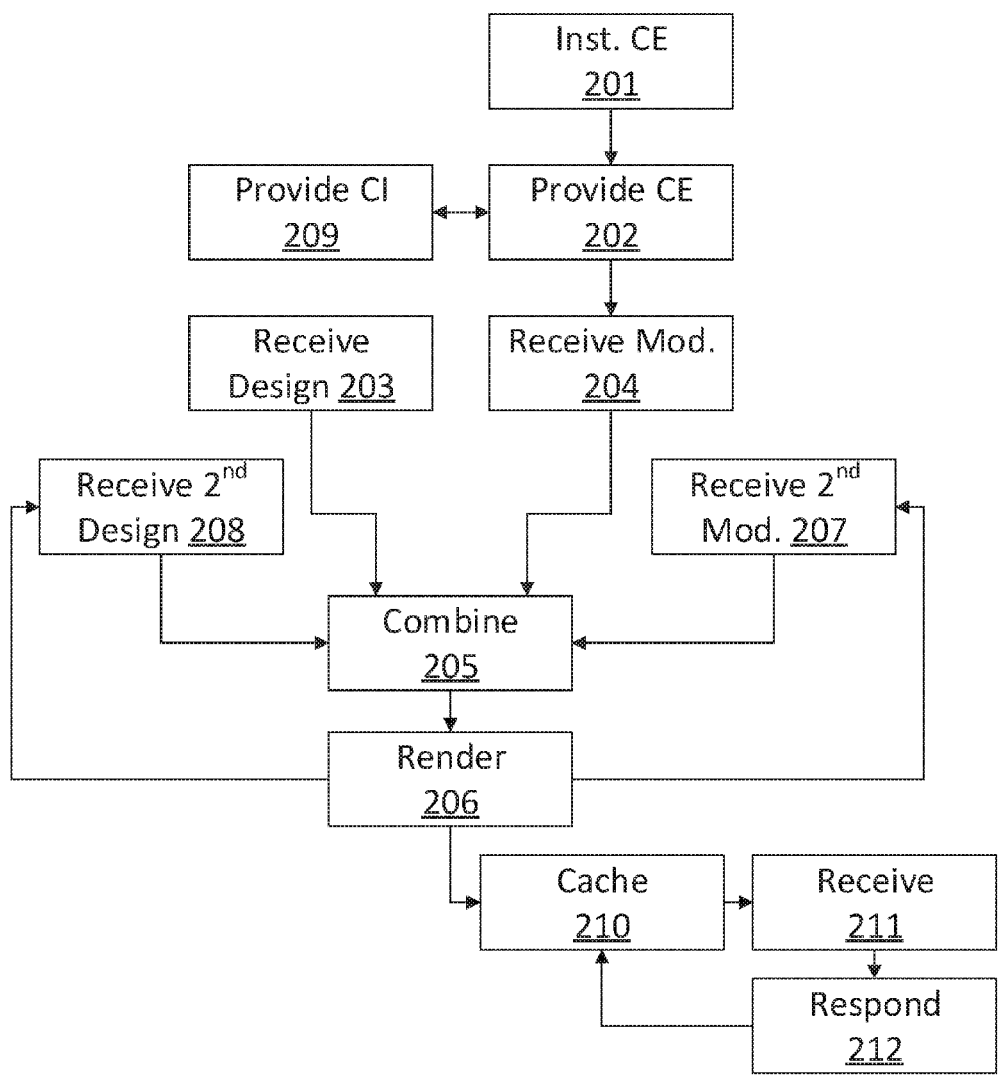
FIG. 2 illustrates a flow chart of a set of methods for designing and modifying a website design.

The export step is also distinguishable in that it can occur as part of other steps in FIG. 2, or it can be a separate step. With reference to FIG. 2, the export step can be a separate step interjected between steps 203 and 205, or steps 208 and 205; and it can also be conducted as part of step 205. In other words, the encoding can be generated and combined with the modification in a single step rather than two separate steps. For example, during export, the server means can insert an <a> tag before and an </a> tag after elements in the design with a link interaction. As another example, after export, the server means can alter a hyperlink in the encoding of the design. This example would allow the programmer to iteratively change the URL for a page. The server means would find and replace all code that would link to the original URL and swap in the new URL. This kind of modification is done frequently for search engine optimization and better organization of a website. As such, it is the kind of modification that is best done after export. As exporting a design can be a time consuming process, certain efficiency benefits can be achieved by conducting combination step 205 after export. This is particularly relevant to situations such as the URL swap mentioned above that are conducted with high frequency. In other approaches, different modifications or sets of modifications could be combined with the encoding during export and after export.

To facilitate some of the various methods mentioned above, server means 104 could instantiate a code generator, such as code generator 109, to facilitate the combining and exporting steps described with reference to FIG. 2. In approaches in which the design is uploaded to the server means and then exported, code generator 109 could generate the encoding of the design and store the design for later combination with later modifications. Code generator 109 could also be used to combine encodings uploaded from workstation 101 with modifications received from workstation 107. In these approaches, workstation 101 could have a code generator to generate the encoding for uploading to the server means. Finally, code generator 109 could also be used to export the design and combine it with any available modifications in a single step.

The combination of the modification and design encoding could be controlled by the programmer in that the programmer could be provided with the ability to select a predetermined insertion point for the modification to be inserted into the design encoding. As mentioned previously, information identifying the selection of this predetermined insertion point could be included in the modification itself. The server means could provide this functionality to the programmer via a workstation such as workstation 107. As such, the set of methods in FIG. 2 could include a step 209 of providing a code insertion interface to the programmer via a network such as network 106. The predetermined insertion points can be executable portions of the encoding of the design. For example, the predetermined insertion points could be a head tag in the website design, a name of a widget in the design that was chosen by a designer, or an end of a page. A programmer would be able to select which insertion point would be used for inserting the modification. The programmer could choose one or more of the available types of insertion points for all of the portions of the modification being added to the design, or could select individual insertion points for specific portions of the modification being added to the design.

Providing programmers with the ability to select where the code can be added provides certain benefits as the order of elements in the encoding can affect the performance of the design as it is rendered, and can also affect the final design as it is rendered. Returning to the example of a plugin, certain plugins require code snippets to be located in a specific point in the encoding relative to other elements, and some plugins require that certain objects be loaded before they are able to execute. Therefore, if programmers were not able to specify where in the encoding the modifications were added, there may be situations where the modifications would not be functional when added to the design.

The set of methods 200 can allow programmers and designers to add additional modifications to the design or re-specify designs in the design tool while continuing to serve an available version of the website design. With reference again to FIG. 2, step 210 involves caching the modified encoding of said design in a cache administrated by the server means. The cache could be cache 110 in FIG. 1. Cache 110 will contain at least a portion of the modified encoding that is necessary for the rendering of a web page of said design. For example, the modified encoding could include JavaScript, HTML, and CSS but may need access to additional files such as image or video files to render a complete website. Cache step 210 is illustrated as following rendering step 206 to represent the fact that any combination and iteration of steps 201-208 could occur to produce an encoding with modifications that can be cached in step 210. While the modified encoding is cached, step 211 could occur in which a server means, such as server means 104, could receive a request for a page of the modified design from a player web browser, such as player 111. The server means could then respond to this request from the player by providing the modified encoding of the design from the cache. Such a step is illustrated in the figure as step 212. This step could be conducted while a second modification was being saved to server means 104 from workstation 107. The step could also be conducted while a second design was being uploaded to server means 104 from workstation 108. This step could also be conducted while a design and a modification were being combined by server means 104. The server means could then continue to serve the modified encoding of the design from the cache until the second modification or second design was received by server means 104 from network 106, or until a specific server within a multiple-server server means 104 had completed preparation of the modified page for caching. In other words, although other events could expire the cache, server means 104 would be configured to replace the cached version of the website design when additional modifications or designs were received that contained changes to the design. This caching could be on a page-by-page basis in the design such that only pages that were modified by the additional content would be affected.

Although embodiments of the invention have been discussed primarily with respect to specific embodiments thereof, other variations are possible. Various configurations of the described system may be used in place of, or in addition to, the configurations presented herein. Those skilled in the art will appreciate that the foregoing description is by way of example only, and is not intended to limit the invention. Furthermore, nothing in the disclosure should indicate that the invention is limited to systems and methods that involve any particular hardware for providing access to the code editor and design environment, as any computing device that is able to participate in the flow of information between a user and the software may be used. In general, any diagrams presented are only intended to indicate one possible configuration, and many variations are possible. Those skilled in the art will also appreciate that methods and systems consistent with the present invention are suitable for use in a wide range of applications encompassing any related to website or web application development and management.

Figure 3:
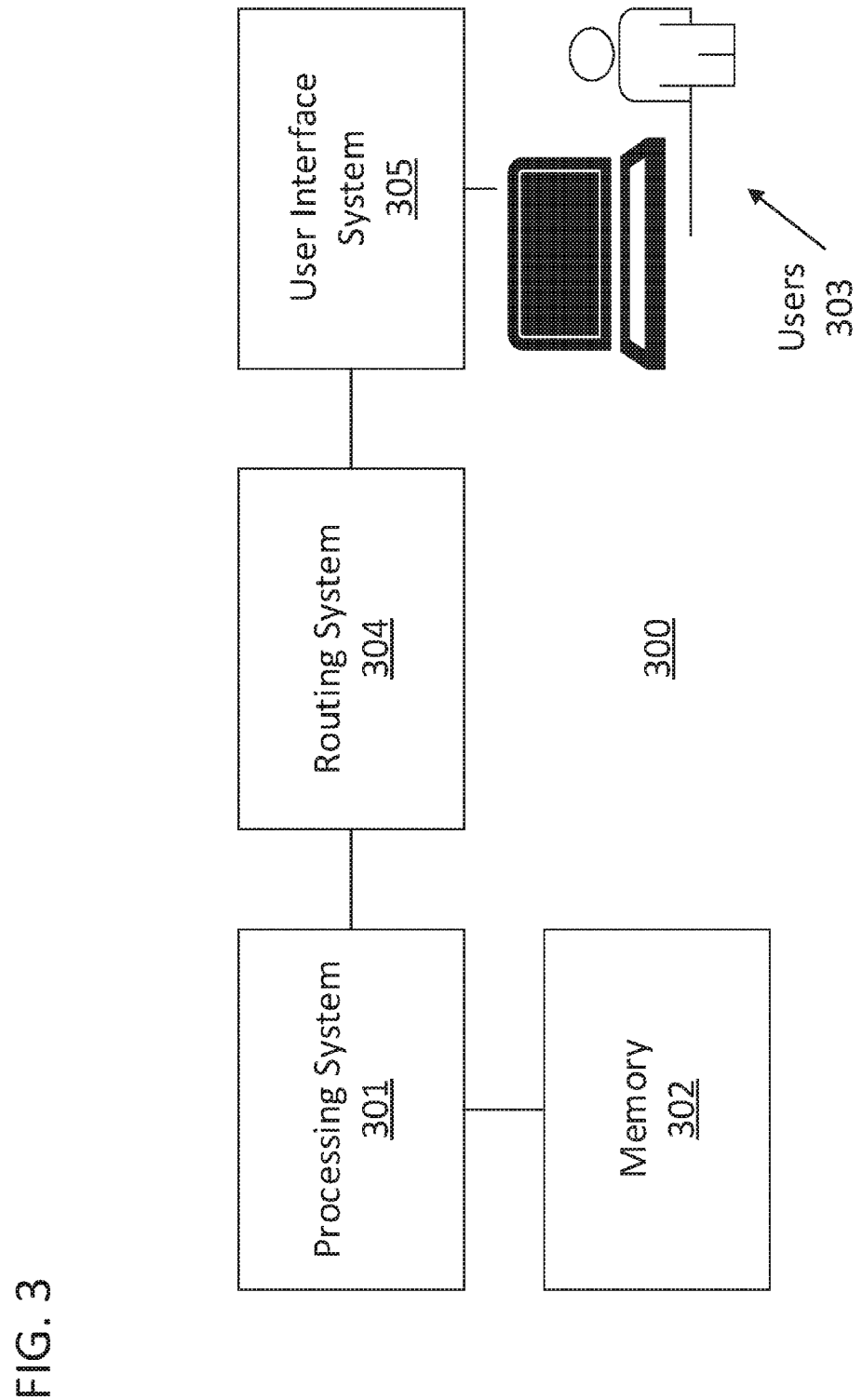
FIG. 3 illustrate a block diagram of a computer system that is capable of being used in accordance with the methods disclosed herein.

Any of the methods and steps described herein can be conducted through the use of a computer system 300 as shown in FIG. 3. For example, the design environment could be provided by a processing system 301 acting in tandem with a memory 302. A user 303 would be able to access the design environment through the use of a routing system 303 and a user interface system 305. Any method steps involving providing or accepting things to and from a user can be conducted using interface system 305. Any method steps involving executing an action can be conducted using processing system 301 alone or in combination with memory 302. FIG. 3 is only an illustrative computer system that is amenable to operation in accordance with embodiments of the present invention and variant computer system topologies may be used in its stead. Nothing in this description should limit the processor of processing system 301 to a single processor, as the function of this block can be accomplished by multiple physical processors located either on a single work station or server, or distributed through a network. It is not essential for memory 302 to be physically distinguishable from processing system 301, as they are merely illustrated as separate blocks for purposes of invoking common conceptions of how computing systems operate. Routing system 304 could be the internal routing system of a single work station, a LAN, a WAN, a wired or wireless network, the Internet, or any other system capable of routing signals. User interface system 305 could be a work station, a computer, a mobile phone or other mobile device, or any computing device or group of computing devices capable of receiving inputs from a single user or group of users. FIG. 3 should also not be taken to indicate that the invention can only involve design environments or design programs that may only be accessed by one user as there could be multiple users 303 and that group of multiple users 303 could access the design environment using any number of routing systems 304. Those users could also access the design environment simultaneously.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A system comprising:
a locally-instantiated graphical design tool and a separate server-instantiated code editor that are both used to design a web page;
a first workstation that locally instantiates the graphical design tool, wherein the graphical design tool provides a drag and drop interface to allow a designer to specify a design for the web page;
a data store that: (i) is locally available to the first workstation; and (ii) receives and stores the design as a saved design;
a code generator that produces an encoding of the saved design through an export process;
a second workstation that provides access to the code editor, wherein the code editor allows a programmer to: (i) program a code snippet for a plugin feature; and (ii) select an insertion point in the encoding for the code snippet; and wherein the second workstation generates a script to insert the code snippet at the insertion point; and
a server means that: (i) instantiates the code editor for the second workstation; (ii) generates the web page by inserting the code snippet into the encoding at the insertion point according to the script; (iii) alters a hyperlink in the encoding; and (iv) serves the web page to a web browser;
wherein:
the code editor and the graphical design tool are separate and distinct tools;
the server means is separate from the first workstation;
the server means saves the code snippet, the script and the insertion point as a modification to the encoding, the modification being isolated from the saved design;
the modification is isolated from the first workstation; and the plugin feature cannot be defined in the graphical design tool.

2. The system of claim 1, wherein:
the encoding of the saved design is in a form of one or more files containing HTML, CSS, and JAVASCRIPT code;
the encoding of the saved design is rendered in the web browser;
the saved design is in a native format of the graphical design tool; and
the saved design cannot be rendered in the web browser.

3. The system of claim 1, wherein the server means comprises:
a database server that saves the script and the insertion point; and
a software-as-service server that instantiates the code editor;
wherein the first workstation instantiates the code generator; and
wherein the first workstation uploads the encoding of the saved design to the server means.

4. The system of claim 1, wherein the server means comprises:
a database server that saves the script and the insertion point; and
a software-as-service server that instantiates the code editor;
wherein the server means instantiates the code generator; and
wherein the first workstation uploads the saved design to the server means.

5. The system of claim 4, wherein:
the code generator generates the web page during the export process by seamlessly combining the script and the saved design at the insertion point.

6. The system of claim 1, wherein:
the code editor allows the programmer to: (i) program a second code snippet; and (ii) select a second insertion point for the second code snippet; and wherein the second workstation generates a second script to insert the second code snippet at the second insertion point;
the insertion point and the second insertion point are executable portions of the encoding of the saved design;
the insertion point and the second insertion point are different; and
the insertion point and the second insertion point are each chosen from one or more available types of insertion points.

7. The system of claim 1, wherein:
the insertion point is chosen from one or more available types of insertion points; and
the one or more available types of insertion points include one or more of: a head tag, a body tag, an end of a page in the encoding, and a name of a widget in the encoding.

8. A system comprising:
a first workstation that locally instantiates a graphical design tool, wherein the graphical design tool provides an interface to allow a designer to specify a design for a web page;
a data store that is: (i) locally available to the first workstation; and (ii) receives and stores the design as a saved design in a native format of the graphical design tool;
a code generator that produces an encoding of the saved design through an export process;
a code editor that allows a programmer to: (i) program a code snippet for a plugin feature; and (ii) select an insertion point in the encoding for the code snippet from a set of available types of insertion points; and wherein the second workstation generates a script to insert the code snippet at the insertion point;
a server means that: (i) saves the code snippet, the script and the insertion point as a modification to the encoding of the saved design that is isolated from the saved design; (ii) instantiates the code editor; and (iii) produces a modified encoding by seamlessly combining the modification and the encoding of the saved design by inserting the code snippet into the encoding of the saved design at the insertion point according to the script; and (iv) alters a hyperlink in the encoding; and
a player that renders the web page by rendering the modified encoding in a web browser;
wherein:
the code editor and the graphical design tool are separate and distinct tools;
the server means is separate from the first workstation;
the server means saves the modification and the encoding of the saved design;
the modification is isolated from the first workstation; and
the plugin feature cannot be defined in the graphical design tool.

9. The system of claim 8, wherein:
the encoding of the saved design is in a form of one or more files containing HTML, CSS, and JAVASCRIPT code; and
the saved design cannot be rendered in the web browser.

10. The system of claim 8, wherein the server means comprises:
a database server that stores the modification; and
a software-as-service server that instantiates the code editor;
wherein the first workstation instantiates the code generator; and
wherein the first workstation uploads the encoding of the saved design to the server means.

11. The system of claim 8, wherein the server means comprises:
a database server that stores the modification; and
a software-as-service server that instantiates the code editor;
wherein the server means instantiates the code generator; and
wherein the first workstation uploads the saved design to the server means.

12. The system of claim 11, wherein:
the modification cannot be implemented by the designer using the graphical design tool; and
the code generator generates the modified encoding during the export process.

13. The system of claim 8, wherein:
the set of available types of insertion points include one or more of: a head tag, a body tag, an end of a page in the encoding, and a name of a widget in the encoding.

14. A system comprising:
a first workstation that locally instantiates a graphical design tool, wherein the graphical design tool provides a drag and drop interface to allow a designer to specify a design for a web page;
a data store that: (i) is locally available to the first workstation; and (ii) receives and stores the design as a saved design;

a code generator that produces an encoding of the saved design through an export process; and a server that instantiates a code editor for a second workstation, wherein the code editor allows a programmer working on the second workstation to: (i) program a code snippet for a plugin feature; and (ii) select an insertion point in the encoding for the code snippet from a set of predetermined insertion points; and wherein the second workstation generates a script to insert the code snippet at the insertion point, the script being isolated from the saved design;

wherein:

the server generates the web page by inserting the code snippet into the encoding of the saved design at the insertion point according to the script and altering a hyperlink in the encoding;

the code editor and the graphical design tool are separate and distinct tools;

the server is separate from the first workstation;

the server saves the code snippet, the script and the insertion point as a modification to the encoding, the modification being isolated from the saved design;

the modification is isolated from the first workstation; and the plugin feature cannot be defined in the graphical design tool.

15. The system of claim 14, wherein:

the encoding of the saved design is in a form of one or more files containing HTML, CSS, and JAVASCRIPT code;

the encoding of the saved design is rendered in a web browser;

the saved design is in a native format of the graphical design tool; and the saved design cannot be rendered in the web browser.

16. The system of claim 14, wherein the server comprises:

a database server that saves the script and the insertion point; and a software-as-service server that instantiates the code editor;

wherein the first workstation instantiates the code generator; and wherein the first workstation uploads the encoding of the saved design to the server.

17. The system of claim 14, wherein the server comprises:

a database server that saves the script and the insertion point; and a software-as-service server that instantiates the code editor;

wherein the server instantiates the code generator; and wherein the first workstation uploads the saved design to the server.

18. The system of claim 17, wherein:

the code generator generates the web page during the export process by seamlessly combining the script and the saved design at the insertion point.

19. The system of claim 14, wherein:

the code editor allows the programmer to: (i) program a second code snippet; and (ii) select a second insertion point for the second code snippet; and wherein the second workstation generates a second script to insert the second code snippet at the second insertion point;

the insertion point and the second insertion point are executable portions of the encoding of the saved design;

the insertion point and the second insertion point are different; and the insertion point and the second insertion point are each chosen from one or more available types of insertion points.

20. The system of claim 14, further comprising:

a cache administrated by the server that contains at least a portion of an encoding of the web page, the portion of the encoding of the web page being necessary for a rendering of the web page, and the encoding of the web page including the script and the encoding of the saved design; and a network connection on which a request for the web page is received from a web browser;

wherein the server responds to the request by providing the portion of the encoding of the web page from the cache until a new version of the script is provided to the server.

21. The system of claim 14, further comprising:

a cache administrated by the server that contains at least a portion of an encoding of the web page, the portion of the encoding of the web page being necessary for a rendering of the web page, and the encoding of the web page including the script and the encoding of the saved design; and a network connection on which a request for the web page is received from a web browser;

wherein the server responds to the request by providing the portion of the encoding of the web page from the cache until a new version of the encoding of the saved design is stored on the server.

* * * * *